Figure 2:
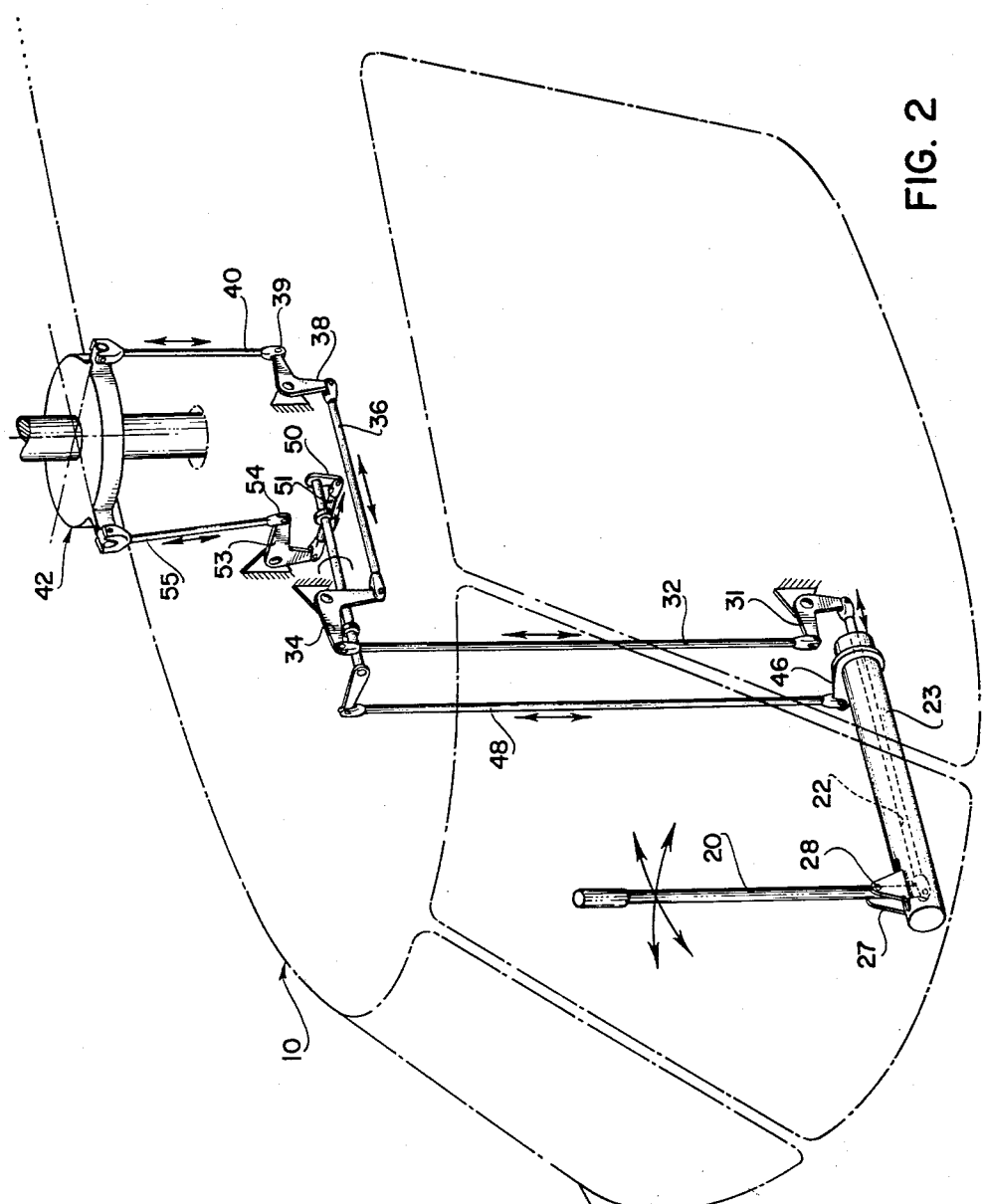

Feb. 4, 1964     I. H. CULVER ETAL     3,120,276
HELICOPTER CONTROL LINKAGE FOR AUTOMATIC PITCH AND ROLL DAMPING
Filed Nov. 30, 1960     3 Sheets-Sheet 1
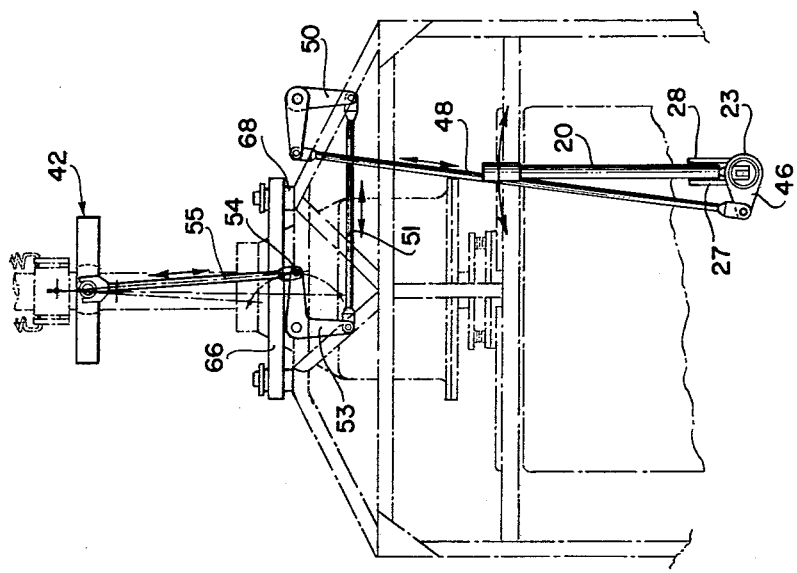
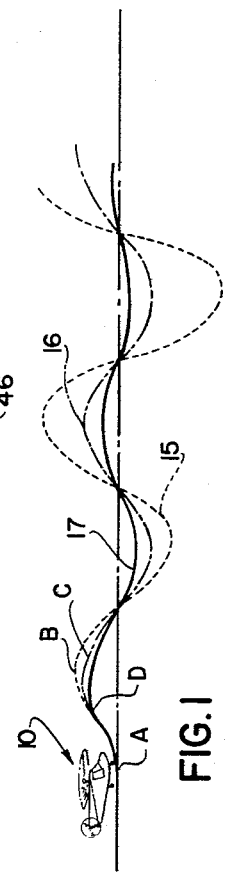
*INVENTORS*
IRVEN H. CULVER
HENRY C. DANIELSON
By *George C. Sullivan*
         Agent INVENTORS
IRVEN H. CULVER
HENRY C. DANIELSON
By *George Sullivan*
Agent

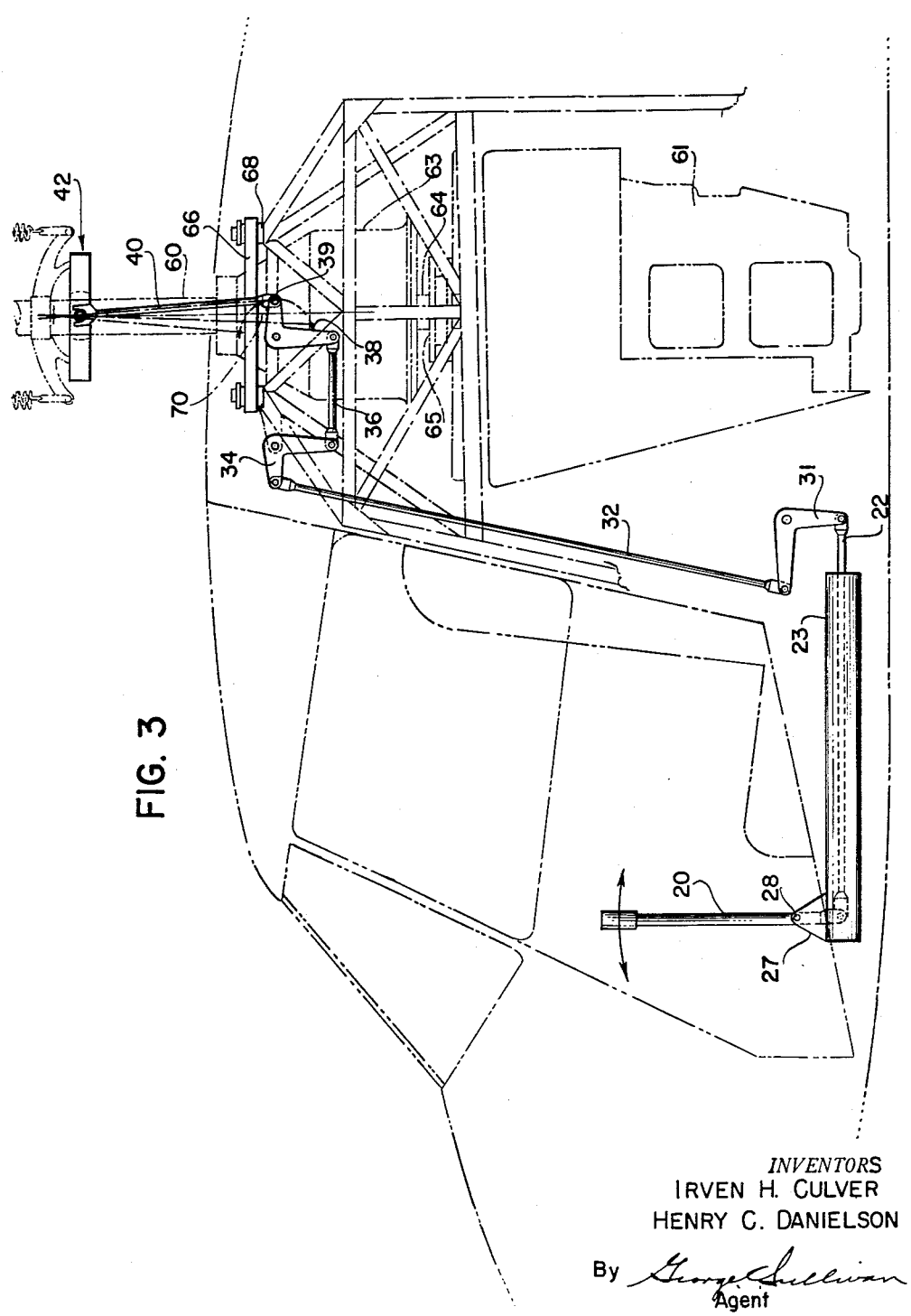

United States Patent Office 3,120,276
Patented Feb. 4, 1964

3,120,276
HELICOPTER CONTROL LINKAGE FOR AUTOMATIC PITCH AND ROLL DAMPING
Irven H. Culver, Burbank, and Henry C. Danielson, Northridge, Calif., assignors to Lockheed Aircraft Corporation, Burbank, Calif.
Filed Nov. 30, 1960, Ser. No. 72,759
3 Claims. (Cl. 170—160.25)

This invention relates to a rotary wing aircraft and more particularly to a control linkage therefor adapted to damp undesirable pitch and roll oscillations.

A helicopter in flight is subject to disturbances from wind gusts or otherwise which displace the body of the helicopter with respect to the rotor either in pitch or roll. As with all bodies in rotary motion, the rotor tends to maintain its plane of rotation with any divergence between the rotor and the body of the helicopter being taken up in bending of the rotor blades and the rotor shaft. This divergence of the helicopter body with respect to the rotor stores up a force causing it to spring back toward the rotor usually with such force that it passes through the neutral position from which it was disturbed in the opposite direction rapidly increasing the oscillation until a dangerous condition is approached.

The normal way to handle this oscillation problem is for the pilot to control the plane of rotation of the rotor blades so that they are tilted in the direction of the pitch or roll of the helicopter body. Thus, there will be less of a building up of a spring force tending to return the helicopter body to the attitude from which it was disturbed. Because there are many forces in and about the helicopter body during its flight and on the ground which influence it about the pitch and roll axes, the task of the pilot is great to maintain stability. Small oscillations are liable not to be detected until they approach the dangerous stage.

One prior effort to solve this problem involved the use of an inertia device to sense vertical acceleration which then changed the cyclic pitch of the rotor blades so as to return the helicopter's flight path to horizontal. Such a device is shown in Patent No. 2,743,071 dated April 24, 1956. Such device only corrected disturbances around the pitch axis. Correction was delayed until vertical acceleration took place which normally occurred sometime after the disturbance.

It is the primary object of the present invention to provide in a rotary wing aircraft or the like, control linkage means operating automatically to damp the aforementioned disturbances about the roll and pitch axes. Relative movements between the rotor plane and the aircraft body cause the control linkage to alter the plane of rotation so as to minimize the divergence.

It is another object of the present invention to provide a control linkage means so connected that movement of the body of the helicopter will cause the rotor to precess in the direction of the movement so as to minimize storing of spring forces between the body and the rotor plane.

It is a further object of the present invention to provide a control linkage which will sense and correct disturbances to the helicopter body with respect to the rotor immediately rather than at a later moment when the effects of such a disturbance are detected through a vertical acceleration device. The inertia sensing device detects disturbances after vertical acceleration has begun. Prior to that there is deflection between the rotor and the body which results in the vertical acceleration. The present invention detects and corrects the earlier deflection.

It is another object of the present invention to provide a control linkage which will sense disturbances not only on a pitch axis but also roll axis and correct the same. Like rotor control linkage is provided on the roll axis and the pitch axis.

Further objects and advantages of the present invention will become apparent from a reading of the following specification taken in conjunction with the appended drawings.

FIGURE 1 shows the effects of disturbances to a rotary wing aircraft with and without the present invention.
FIGURE 2 shows in perspective the control linkages according to the present invention.
FIGURE 3 is a side view of the pitch control linkage.
FIGURE 4 is a front view of the roll control linkage.

The operation of a conventional type rotary wing aircraft such as are inherently unstable and which therefore tend to fly in increasingly divergent oscillating flight paths are indicated by curve 15 of helicopter 10 in FIGURE 1. Curve 15 illustrates how the oscillations due disturbances of an inherently unstable helicopter aircraft tend to constantly increase in velocity and amplitude. Where the rotary wing aircraft is of neutral stability, a disturbing gust of wind will cause it to follow a constant oscillatory path 16 of FIGURE 1. Thus, as shown in FIGURE 1, whenever the aircraft is disturbed by an oncoming gust or the like as at point A on curve 16, the rotor is tilted upwardly and the aircraft accelerated vertically to rise to a point indicated by B. The rotor, being a body in rotary motion, tends to maintain its plane of rotation in space much like a gyroscope. However, in all rotary wing aircraft there must be some elasticity between the rotor mast and the helicopter body. Thus, an upward gust which might pitch the body of the helicopter downward would cause a divergence between the horizontal plane of the body of the helicopter and the plane of the rotation of the rotor. These two planes will tend to spring together at crest B causing the rotor to be precessed downwardly until it is pitched forward causing the path of the flight to begin to descend as at point C in FIGURE 1. Opposite forces will be experienced at the bottom of the next oscillation pitching the helicopter upwardly again. The flight path then continues to oscillate with a substantially constant velocity and amplitudes above and below the horizon of the original straight line flight path. On the other hand, as illustrated by the curve 7, whenever a rotary wing aircraft embodying the present invention is met by an oncoming gust and pitches upwardly, the control linkage goes into operation automatically such as at the position indicated at A whereby to antticipate and dampen the forces normally producing phugoidal oscillation.

FIGURE 2 is a perspective of the helicopter with the control linkage which goes to make up the present invention. The helicopter is shown equipped with the conventional control stick 20 which, when moved from side to side, provides roll input forces to the rotor and when moved fore and aft provides pitch input forces. The control forces through control stick 20 are transmitted through a push-pull rod 22 and a torque tube 23 to the pitch and roll linkages for the rotor.

Pitch control forces are transmitted through rod 22. Torque tubes 23 has upstanding plates 27 on its forward end with a pin 28 at its upper end around which the stick 20 is pivoted in its fore and aft motion. The lower edge of the stock 20 is pivoted to the push rod 22. Push rod 22 is pivoted to the lower arm of bell crank 31 which is pivoted to the helicopter's body structure so that fore and aft forces of push rod 22 will cause push rod 32 to move up and down. Push rod 32 is pivoted to the forward arm of bell crank 34 which is pivoted to the helicopter structure. The lower arm of bell crank 34 is pivoted to push rod 36 which is pivoted at its aft end to bell crank 38 again pivoted to the helicopter body. The aft arm of bell crank 38 is pivoted at 39 to push rod 40 which in turn is pivoted to the swash plate 42.

Roll control forces are transmitted through the torque tube 23 and its lateral arm 46. Lateral movements of the stick 20 cause the torque tube 23 to move lateral arm 46 causing the push rod 48 to move up or down. The upper end of push rod 48 is pivoted to bell crank 50 which is pivoted to the helicopter body structure on a fore and aft axis. The lower arm of bell crank 50 is pivoted to push rod 51 which is in turn pivoted in turn to the lower arm of bell crank 53 again pivoted to the helicopter structure. Movement of bell crank 53 around its pivot will cause the push rod 55 to tilt the swash plate 42 around a lateral axis for roll input forces.

It should be noted at this point that the swash plate 42 as shown is that described with more particularity in co-pending U.S. patent application Serial Number 844,886 to a Helicopter dated October 7, 1959, now Patent 3,080,001. In that application as in the showing in FIGURE 2, input forces are transmitted by means of springs from the swash plate to the rotor blades necessitating input forces 90° prior to the time of the desired change according to the well-known law of gryoscopic precession. Thus, input forces to the rotor for pitch control will be applied on the lateral axis or side of the swash plate and roll control forces will be applied on the longitudinal axis of the craft in each case 90° before the desired result. If the linkage system according to the present invention is to be used on a helicopter having positive pitch control inputs to the rotor blades such as shown in the U.S. Patent No. 2,743,071 dated April 24, 1956, the pitch control forces will be applied around the lateral axis and the roll control forces around the longitudinal axis of the swash plate as shown in FIGURE 1 of that patent. Thus, push rods 40 and 55 of FIGURE 2 of this application would be connected to the swash plate 42, 90° to the counterclockwise form that shown assuming that the rotor rotated counterclockwise as viewed from above.

The pitch control linkage is shown in a side view in FIGURE 3. To review again the motion of the control linkage it will be remembered that fore and aft movement of stick 20 will cause it to pivot around the pin 28 causing rod 22 to move bell crank 31 which will cause the push rod 32 to move up and down moving bell crank 34 about its pivot causing push rod 36 to move fore and aft and bell crank 38 to rotate about its axis. Bell crank 38 is pivoted at point 39 to push rod 40 which is attached to the swash plate 42 at its upper end. Note at this point that the pivot point 39 is aft of a lateral plane passing through the center of rotation of the rotor shaft 60 in the direction of rotation of the rotor. The rotor shaft 60 is driven by engine 61 connected to gear box 63 through shaft 64 and universal joint 65. Gear box 63 is mounted in frame work 66 which is attached at four points by shock mounts 68 to the helicopter body. Shock mounts 68 permit a small amount of motion of the gear box frame 66 with respect to the helicopter body to which the shock mounts 68 are attached. Any disturbances between the rotor and the helicopter body will be reflected substantially in rotation of the body about the effective center of rotation 70 defined as the intersection of the longitudinal axis of the drive shaft and a horizontal plane passing through the center of the shock mounts 68. Shock mounts 68 will permit this rotaiton of the body by extension on one side and compression on the other.

For purposes of understanding, the rotor may be considered to maintain its plane of rotation with the body doing all of the movement. Should there be a disturbance which will cause the body of the helicopter to be pitched downwradly with respect to the plane of rotation of the rotor, there will be a counterclockwise rotation of the helicopter body about the effective center of rotation 70. Recall again that the pivot point 39 between the bell crank 38 and the push rod 40 to the swash plate 42 is displaced slightly aft of the lateral plane passing through the center of rotation of the shaft 60 in the direction of its rotation which means it is slightly aft of the effective center of rotation 70. Thus, counterclockwise rotation of the helicopter body about center of rotation 70 will cause pivot point 39 to move upwardly with respect to its original position, and the rod 40 will push up on swash plate 42. This up movement on swash plate 42 will cause the rotor to precess so that its highest point of rotation then will be on the aft edge of the rotation disc considering that input forces to a rotating body are effective 90° later in the plane of rotation. Thus, there will be less angular divergence between the plane of rotation and the longitudinal axis of the helicopter body because the rotor is caused to precess in the direction in which the helicopter body has pitched. This minimizes the build up of spring forces. Conversely, should the helicopter body be pitched upwardly with respect to the plane of the rotation of the rotor, the location of the pivot point 39 aft of the center of rotation 70 will cause the push rod 40 to be pulled down thus causing the plane of the rotation of the rotor to be tilted upwardly at the front and downwardly at the aft of its rotational disc following the up pitch of the helicopter body to provide less of a spread between the two and less spring action.

FIGURE 4 shows the roll control linkages looking from the front of the aircraft. Reviewing the normal control inputs we find that if a starboard or right roll is desired the control stick will be moved to the right (left as viewed in FIGURE 4). This will rotate the arm 46 counterclockwise pulling the rod 48 down. Rod 48 in turn rotates bell crank 50 counterclockwise moving the rod 51 to the right. This in turn rotates the bell crank 53 counterclockwise moving the rod 55 up tilting the swash plate around lateral axis toward the back of the helicopter. Since any control inputs to the rotary body are effective 90° after the input, the rotor disc reacts to the control input when it reaches a point 90° later in its rotation or the left side of the disc will be tilted up as viewed from above if the rotation of the rotor is counterclockwise looking from above. By similar reasoning a movement of the control stick 20 to the right in FIGURE 4 which would produce a left roll would pull rod 55 downwardly thus tilting the rotor disc down to the left or the port side of the helicopter creating a left roll.

Note that the pivot point 54 between bell crank 53 and push rod 55 is offset to one side of a vertical plane passing through the rotational axis of the rotor and the longitudinal axis of the body 10 in the direction of rotation of the rotor disc so that should there be a movement of the helicopter body 10 about the effective center of rotation 70, rod 55 will be effectively moved up or down thus changing the plane of rotation of the rotor so that it precesses in the direction of the disturbance of the body. Thus looking at FIGURE 4 should the body rotate in a counterclockwise direction with respect to the rotor plane of rotation the pivot 54 being located to the right of the effective center of rotation 70 will cause rod 55 to move upwardly to apply an up force on the forward edge of the swash plate causing the plane of rotation of the rotor to tilt upwardly 90° later or on the left side of the aircraft (or the right side as viewed in FIGURE 4). Thus the rotor follows the disturbance applied to the aircraft body. Conversely, should the aircraft body rotate clockwise as viewed in FIGURE 4 the pivot point 54 will be moved down with respect to the center of rotation 70 pulling rod 55 down thus causing the plane of rotation to tilt clockwise as seen in FIGURE 4 following the inadvertent roll of the body so as to neutralize the storing up of spring forces between the rotor and the body to minimize spring back.

The location of the pivot point 39 to one side of the vertical plane passing laterally through the shaft 60 and pivot point 54 to one side of the vertical plane passing longitudinally with respect to the body through rotor shaft 60 in the direction of rotor rotation might conceivably be at the lower side of the helicopter body instead of close to the center of rotation 70. That is, the push rod 40 could be extended downwardly to meet bell crank 31 which would be located more or less aft and under the center of rotation so that two push rods 22 and 40 and a single bell crank 31 would be the total linkage required for pitch control. Likewise, the push rod 55 could be extended to meet with the arm 46 on the torque tube 23 which would be elongated in such a manner so that pivot point 54 would be located to one side of the vertical plane passing through to the longitudinal axis of the helicopter and shaft 60. In both instances, divergence of the horizontal plane of the helicopter body and the plane of rotation of the helicopter rotor will cause the push rods 40 and 55 to effectively lengthen or shorten so as to cause the rotor to precess in the direction of the pitch or roll of the helicopter body to dampen disturbances to it.

As indicated in a previous paragraph the present invention is not restricted to the particular swash plate rotor combination described herein but may be used on helicopters embodying a positive pitch control to the rotor blades wherein the control inputs are connected directly to the feather axis of each rotor blade rather than through a spring attached to the swash plate.

We claim:

1. In a helicopter having a body, a rotor drive shaft elastically mounted with respect to the body, a rotor attached to the drive shaft, and a swashplate mounted on said drive shaft below said rotor, a rotor control mechanism comprising: a generally upright link having a pivotal connection to the swashplate and to the body, said swashplate connection and the longitudinal axis of the drive shaft defining a reference plane, said body connection being outside and ahead of said plane as determined by the direction of rotor rotation, whereby the link exerts a force on the swashplate when the body is displaced with respect to the rotor, which force causes the rotor to precess in the same direction as the body displacement and thereby automatically damps relative displacement of the rotor and body.

2. In a helicopter having a body, a rotor drive shaft elastically mounted with respect to the body, a rotor attached to the drive shaft and adapted for counterclockwise rotation, and a swashplate mounted on said drive shaft below said rotor; a pitch control mechanism comprising: linkage means for tilting said swashplate and thereby supplying a control input to the rotor, said means including a generally upright link having a pivotal connection with the swashplate and with the remainder of said said means, said swashplate connection lying in a vertical reference plane passing laterally through the longitudinal axis of the drive shaft, said connection to the remainder of the linkage means lying aftward of said plane, whereby said link exerts a generally upward force on the swashplate when the body is displaced nose-down with respect to the rotor and a generally downward force on the swashplate when the body is displaced nose-up with respect to the rotor, which forces causing the rotor to precess in the same direction as the body displacement and thereby automatically damping relative pitch displacement of the rotor and body.

3. In a helicopter having a body, a rotor drive shaft elastically mounted with respect to the body, a rotor attached to the drive shaft and adapted for counterclockwise rotation, and a swashplate mounted on said drive shaft below said rotor; a roll control mechanism comprising: linkage means for tilting said swashplate and thereby supplying a control input to the rotor, said means including a generally upright link having a pivotal connection with the swashplate and with the remainder of said means, said swashplate connection lying in a vertical reference plane passing longitudinally through the longitudinal axis of the drive shaft, said connection to the remainder of the linkage means lying to the left of said plane, whereby said link exerts a generally downward force on the swashplate when the body is displaced laterally to the left and a generally upward force on the swashplate when the body is displaced laterally to the right, which forces causing the rotor to precess in the same direction as the body displacement and thereby automatically damping relative roll displacement of the rotor and body.

References Cited in the file of this patent

UNITED STATES PATENTS

| | | |
|---|---|---|
| 2,517,509 | Sikorsky | Aug. 1, 1950 |
| 2,519,762 | Hoffman | Aug. 22, 1950 |
| 2,569,061 | Hunt | Sept. 25, 1951 |
| 2,720,271 | Alex | Oct. 11, 1955 |
| 2,735,500 | Perry | Feb. 21, 1956 |
| 2,743,071 | Kelley | Apr. 24, 1956 |
| 2,792,189 | Altemus | May 14, 1957 |
| 2,949,254 | Bauer | Aug. 16, 1960 |
| 2,959,230 | Doman | Nov. 8, 1960 |